United States Patent
Desai et al.

(10) Patent No.: US 7,677,851 B2
(45) Date of Patent: Mar. 16, 2010

(54) FASTENER ASSEMBLY

(75) Inventors: Dhaval A. Desai, Streamwood, IL (US); Harlan Grueneberg, Elk Grove Village, IL (US); Kenneth J. Neuhengen, Niles, IL (US)

(73) Assignee: Illinois Tool Works Inc., Glenview, IL (US)

( * ) Notice: Subject to any disclaimer, the term of this patent is extended or adjusted under 35 U.S.C. 154(b) by 123 days.

(21) Appl. No.: 11/961,001

(22) Filed: Dec. 20, 2007

(65) Prior Publication Data

US 2008/0166201 A1 Jul. 10, 2008

Related U.S. Application Data

(60) Provisional application No. 60/878,841, filed on Jan. 5, 2007.

(51) Int. Cl.
*F16B 39/30* (2006.01)
(52) U.S. Cl. .................. 411/311; 411/417; 411/134
(58) Field of Classification Search ............. 411/417, 411/421, 311, 134, 313, 411, 308, 310; 472/2, 472/4, 6
See application file for complete search history.

(56) References Cited

U.S. PATENT DOCUMENTS

| | | | | | |
|---|---|---|---|---|---|
| 2,391,308 | A | * | 12/1945 | Hanneman | 411/134 |
| 2,484,644 | A | * | 10/1949 | Poupitch | 411/311 |
| 2,713,883 | A | * | 7/1955 | Poupitch | 411/134 |
| 3,037,221 | A | * | 6/1962 | Lanius, Jr. | 470/4 |
| 3,163,196 | A | * | 12/1964 | Hanneman | 411/134 |
| 3,906,567 | A | * | 9/1975 | Barth et al. | 470/4 |
| 3,913,649 | A | * | 10/1975 | Stanaitis | 411/134 |
| 4,595,324 | A | * | 6/1986 | Sadri | 411/38 |

* cited by examiner

*Primary Examiner*—Gary Estremsky
(74) *Attorney, Agent, or Firm*—Mark W. Croll; Paul F. Donovan

(57) ABSTRACT

A fastener assembly includes a male threaded fastener and a washer captured between a head of the fastener and a thread of the fastener. A terminal portion of the thread adjacent the washer is provided with crest depressions to thereby form material of the thread run out into elevations of the thread between adjacent depressions, to thereby maintain the specified major diameter of the thread adjacent the washer.

17 Claims, 2 Drawing Sheets

FASTENER ASSEMBLY

CROSS-REFERENCE TO RELATED APPLICATIONS

The present regular United States patent application claims the benefits of U.S. Provisional Application for patent Ser. No. 60/878,841, filed on Jan. 5, 2007.

FIELD OF THE INVENTION

The present invention relates generally to threaded fasteners and threaded fastener and washer combinations and, more particularly, the present invention pertains to what often are referred to as captured washer designs in which a washer is held on the shank of a male threaded fastener.

BACKGROUND OF THE INVENTION

Threaded fasteners are commonly used with washers interposed between the head of the fastener and the object against which the fastener is tightened. It is known to provide a washer pre-assembled on a threaded fastener. Washers pre-assembled on screws, bolts and the like are commonly referred to as captured washer fasteners. In a known captured washer design, the washer is captured between the head of the screw and an annular ring provided between the head and the end of the thread nearest the head. It is known to form the annular ring by placing a blade die on top of a standard roll thread die. The blade die is pushed into the screw blank during the rolling process, allowing additional material to mushroom out over the top of the blade to form the ring 360° around the shank of the screw.

A disadvantage of the aforementioned captured washer design is that the cross-sectional area of the shank is reduced at the area where the blade die contacts the blank, resulting in higher risk of premature failure as the fastener is tightened at installation. Further, the annular ring is located above the thread run out, therefore increasing the distance between the washer bearing surface and the area of the thread run out. This can be problematic when thin materials are to be captured by the fastener, in that the fastener will run out of screw thread prior to the fastener seating properly with the washer against the material surface.

Thread pitch is commonly referred to as the distance measured from the crest of one thread to the crest of an adjacent thread. In many applications, it is desirable to hold the unthreaded distance between the last thread and the washer (i.e. the thread to washer distance) within one thread pitch distance. When an annular ring is used, the thread to washer distance may be greater than what the specification allows, to provide sufficient space for the formation of the ring after the thread run out. In these applications, an annular ring may not be used.

In situations in which an annular ring can not be used, it is known to use the thread itself to capture the washer on the fastener. During manufacture of the fastener, the washer is captured between the screw thread and the head of the screw, with no annular ring provided. The washer is assembled over the shank prior to the threads being rolled on in the thread rolling operation. Accordingly, the washer inner hole diameter is generally smaller than the major diameter of the screw thread, but slightly larger than the unthreaded shank of the screw. The rolled thread in the non-annular ring design is intended to keep the washer on the part.

The thread rolling process does not allow the major diameter of the thread to be maintained to the very end of the thread, due to the mechanics of the rolling process. In a final pitch or pitches of the thread, the major diameter of the thread decreases steadily. Thread run out is identified as the area of the thread that falls below the specified major diameter for the fastener.

Since the major diameter decreases, it may fall below the diameter of the center opening in the washer. The washer can tilt and drop over the screw thread as the thread fades out. When this happens, the washer can engage the thread, making the part less than desirable for use, and requiring the washer to be freed from the thread before the fastener assembly can be used. It is known for the inner diameter of the washer to lock up on the thread run out, causing the fastener assembly or other part to be unusable. The washer will not seat properly against the mating surface because it no longer sits freely between the head and the thread. In rapid assembly processes, an unusable fastener assembly can be of significant inconvenience.

Accordingly, it is desirable to maintain the specified major diameter and thread pitch through a larger portion of the thread run out, to provide a functional thread that can be maintained close to the washer. It is also desirable to provide a captured washer assembly in which the washer remains free to move as required for proper seating during fastener tightening.

SUMMARY OF THE INVENTION

In accordance with the present invention, transverse depressions or serrations are provided in the thread run out. By moving material within the thread volume within the thread run out, the specified major diameter can be maintained at regions between the depressions, without removing additional material from the root of the thread, thus maintaining the strength of the part within the modified area.

In one aspect thereof, the present invention provides a captured washer fastener assembly with a fastener having a head, a shank and a thread on the shank; and a washer disposed on the shank between the head and the thread. The thread has a major diameter at a crest of the thread. A terminal portion of the thread adjacent the washer has depressions inwardly therein from the thread crest and thereby forming elevations between adjacent depressions, the elevations having a diameter within specified tolerances for the major diameter.

In another aspect of another form thereof, the present invention provides a fastener assembly with a male threaded fastener having a head, a shank, a thread on the shank and a washer captured between the thread and the head. The thread has a last thread pitch adjacent the washer. The shank has a diameter adjacent the last thread pitch not less than a root diameter of thread pitches more distant from the washer. The last thread pitch has a major diameter throughout a substantial length thereof not less than the washer opening diameter of the washer.

In a further aspect of a further form thereof, the present invention provides a threaded fastener with a shank, a head at an end of the shank, a helical thread on the shank having a thread crest defining a major diameter of the fastener; and a terminal portion of the thread adjacent the head having decreasing material volume while maintaining the major diameter.

An advantage of the present invention in one form thereof is providing a captured washer on a threaded fastener wherein the washer is free to move and seat properly during the tightening process.

Another advantage of the present invention in another form thereof is providing a captured washer on a threaded fastener wherein the major thread diameter is maintained to near the end of the thread.

A still further advantage of the present invention in a still further aspect thereof is providing a captured washer on a threaded fastener that maintains desired minimal spacing between the thread and the washer.

A still further advantage of the present invention in a still further aspect thereof is providing a captured washer on a threaded fastener that can be manufactured efficiently using known threaded fastener forming techniques.

Other features and advantages of the invention will become apparent to those skilled in the art upon review of the following detailed description, claims and drawings in which like numerals are used to designate like features.

Figure 1:
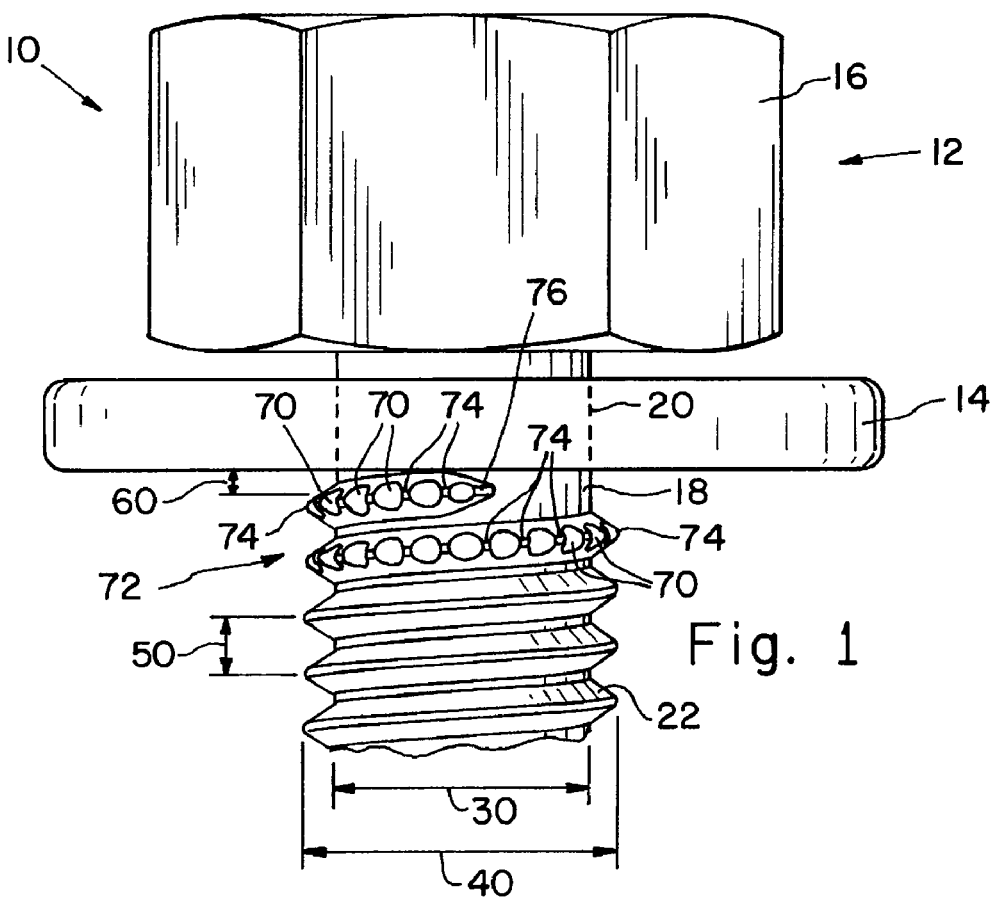
FIG. 1 is an elevational view of a fastener assembly in accordance with the present invention in a first form thereof.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, a fastener assembly 10 in accordance with the present invention is shown. Fastener assembly 10 includes a threaded fastener 12 and a washer 14 captured thereon. Fastener 12 is a bolt, screw or other elongated male threaded fastener including a head 16 and a shank 18. Washer 14 is disposed on shank 18, and in the exemplary embodiment is depicted as a substantially annular, plate-like structure having a central opening 20 therein are of sufficient diameter to slide over shank 18 during manufacture. However, washer 14 can be of other types and shapes than the annular, substantially plate-like structure shown. The present invention can be used also to capture items other than a washer when a captured structure on a male threaded fastener is desirable. Further, fastener 12 in accordance with the present invention can be used without washer 14 when a fastener having minimal thread run out is desired. While fastener 12 is particularly advantageous when used to capture a washer 14 or other structure, advantages of fastener 12 may be applied even when a washer is not used.

A helical thread 22 is provided on shank 18 and is formed in a known thread rolling process after washer 14 has been placed on shank 18. Accordingly, central opening 20 in washer 14 is of a diameter smaller than thread 22 in full thread locations. Various dimensions of the fastener assembly 10 are indicated in FIG. 1. The root diameter indicated by arrow 30 is essentially the diameter of the shank at the base of thread 22. The major diameter indicated by arrow 40 is the diameter of thread 22 at the apex or crest of the thread. The thread pitch indicated by arrow 50 is the axial distance between adjacent thread crests. The thread to washer spacing indicated by arrow 60 is the axial distance between washer 14 and the thread crest of the last thread adjacent the washer.

As those familiar with the art and process of thread rolling will readily understand, in a standard fastener, at a terminal portion of the thread adjacent the head, so called thread run out occurs. In the area of thread run out, the volume of material formed into the thread decreases so that the major diameter continually decreases as the thread fades into the shank. The volume of material forming the thread steadily decreases, and the diameter diminishes. The length of the thread run out portion along the helical path of the thread can be of significant length such that the diameter for the last full pitch adjacent washer may decrease below that of opening in washer. The washer can slide over the thread in the thread run out area. In the area of thread run out, engagement with a female thread is not suitable for tightening the fastener. Accordingly, only full threads some distance from the washer can be used for tightening the fastener assembly. When thin materials are captured by the fastener, tightening can be problematic if insufficient full threads are held in the material.

In fastener assembly 10, a series of adjacent depressions 70 are formed in the crest of thread 22 along a terminal portion 72 of the thread, generally along the length of the thread in which thread run out would occur without the modifications of the present invention. For clarity in the drawing, some but not all depressions 70 are designated with the reference numeral in FIG. 1. Depressions 70 are formed from the crest toward the root of the thread, to displace material in the thread body so as to form elevations such as peaks 74 between adjacent depressions 70. Again, for purposes of clarity, some but not all peaks 74 have been designated with a reference numeral in FIG. 1. With sufficient material displacement from the body of the thread to form peaks 74, the desired major diameter for the fastener can be maintained at the peaks 74, even though the overall volume of material forming the terminal portion of the thread steadily decreases. By maintaining the major diameter at peaks 74, washer 14 is readily captured between head 12 and thread 22, with substantially reduced chance for lock up of the washer on the thread. Further, in one embodiment, the thread to washer spacing is maintained at or less than the pitch distance 50 for desirable fastener characteristics. The major diameter 40 of the thread is maintained without removing additional material from the shank to the thread as is required when an annular ring is formed to capture the washer. Accordingly, shank strength is retained by use of depressions 70. Since the specified major diameter is maintained, the terminal portion 72 can engage a female thread in suitable manner throughout most of the length of the standard thread run out, with only a very short tail portion 76 falling below the specified major diameter. The length of tail portion 76 is insufficient to allow washer 14 to slide over the last thread pitch. Accordingly, washer lockup on the thread is inhibited.

As shown in FIG. 1, two pitches of thread 22 are provided with depressions 70 beneath the freely spinning washer. Advantageously, at least the last thread pitch adjacent washer 14 is provided with depressions 70 and the resultant increased elevation at peaks 74 so as to capture washer 14 and inhibit washer lockup on the thread. The shank diameter adjacent the last thread pitch is no less than the root diameter of thread pitches more distant from washer 14, to maintain consistent strength. Throughout a substantial length thereof, the last thread pitch adjacent washer 14 has a major diameter not less than opening 20 in washer 14 to prevent washer lockup on the thread. However, by providing depressions 70 throughout the length of what otherwise would constitute the thread run out portion, the aforementioned advantages in functionality and performance are achieved. The resulting interrupted thread crest maintains the desired major diameter of the thread.

Figure 2:
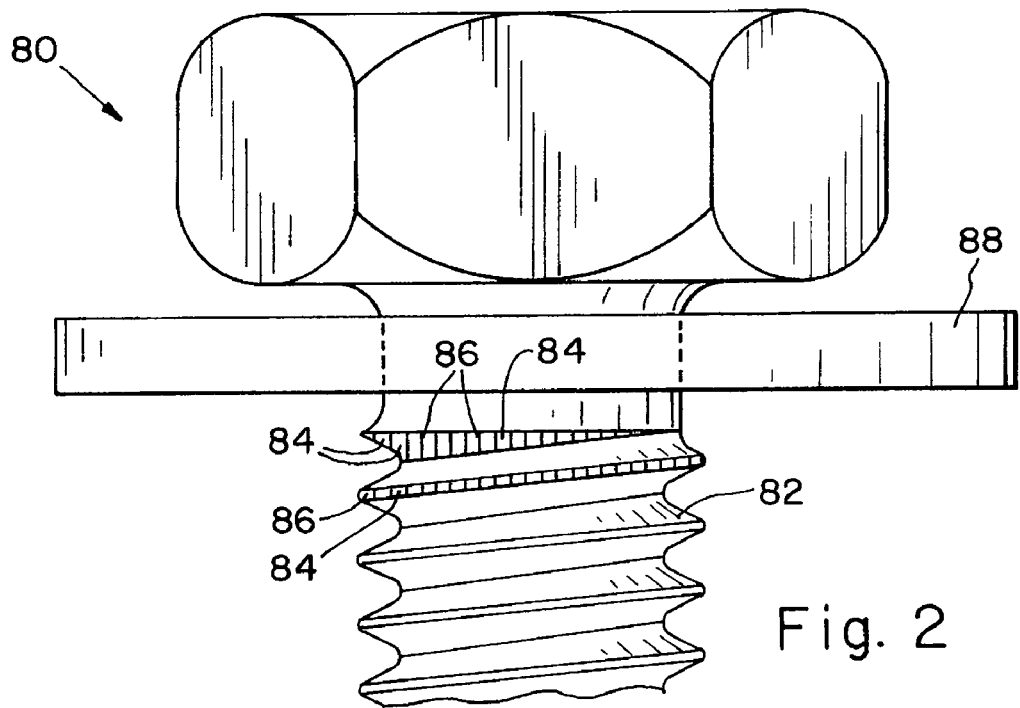
FIG. 2 is an elevational view similar to that of FIG. 1 but illustrating somewhat schematically another embodiment of the present invention.

Terminal portion 72 of the thread is a region of diminishing thread volume. By displacing some of the material in the thread, the major diameter is maintained even with diminishing overall thread volume along the terminal portion. Depressions 70 can be shallower or more distantly spaced when the thread volume is only slightly less than the thread volume of full thread pitches. As the volume continually decreases toward the end of the thread, depressions 70 can be made larger, deeper and/or spaced more closely together so as to maintain the desired major diameter at peaks 74 even while the thread volume falls well below the full thread volume. FIG. 2 indicates fastener 80 having thread 82 with depressions 84 of progressively increasing size and decreasing spacing to form elevations 86 between adjacent depressions to capture a washer 88 and also to achieve the other advantages discussed previously herein.

Figure 3:
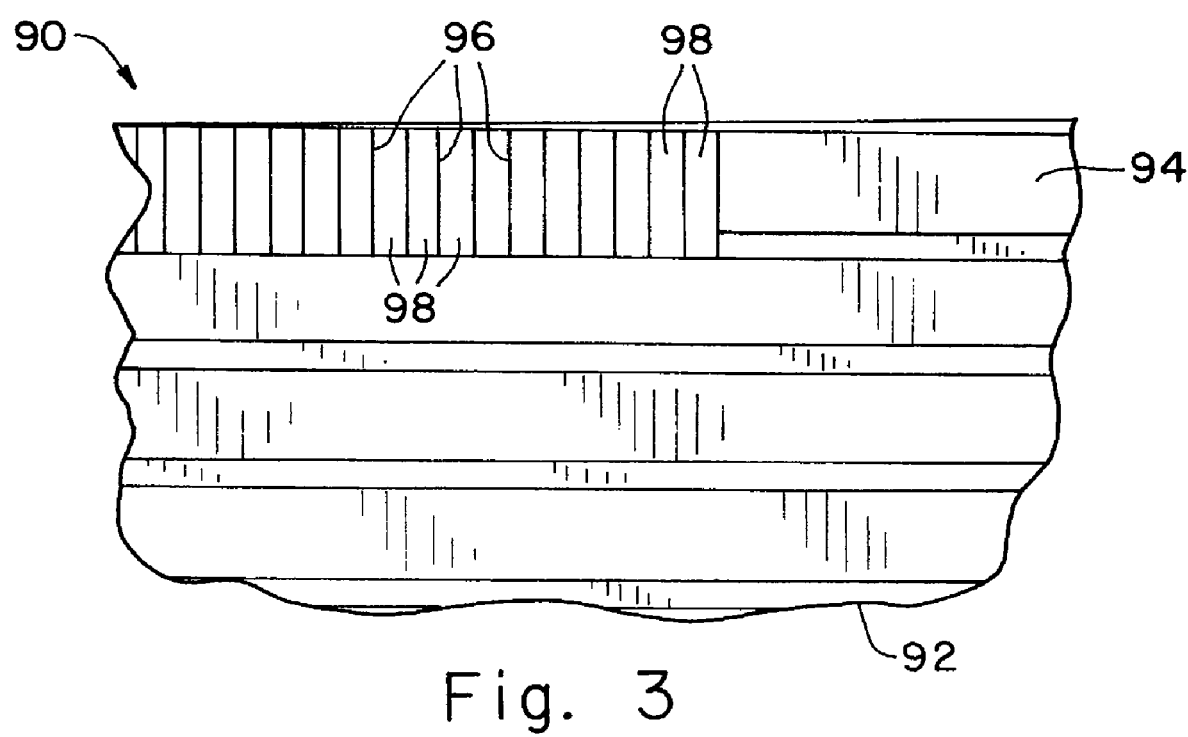
FIG. 3 is a fragmentary enlarged view of a further embodiment of the present invention.

FIG. 3 illustrates a fragmentary portion of a fastener 90 having a shank 92 with a helical thread 94 thereon. A terminal portion of thread 94 is serrated, with transverse ridges 96 separated by transverse depressions 98. Transverse ridges 96 are provided generally across the width of helical thread and 94. The major diameter defined by full thread portions of thread 94 can be maintained at ridges 96. The depth of depressions 98 and/or the sizes of ridges 96 can be adjusted to maintain the desired major diameter even as the thread volume decreases continually. Reforming the thread run out to elevations having transverse ridges 96 maintains volume and strength in the elevations.

The interrupted threaded design of the present invention, with depressions 70, 84, 98 is formed easily and conveniently along with the thread formation process. To make depressions 70, 84, 98, the roller die for thread formation is modified such that the interruptions in the threads are created in conjunction with the thread rolling process. Accordingly, the depressions can be formed in the same process step as the formation of the thread, without additional steps, time or inconvenience being required.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A captured washer fastener assembly, comprising:
   a fastener having a head, a shank and a thread on said shank;
   a washer disposed on said fastener between said head and said thread;
   said thread having a major diameter at a crest of said thread; and
   a terminal portion of said thread adjacent said washer having depressions inwardly therein from the thread crest and thereby forming elevations between adjacent depressions, said elevations having a diameter within specified tolerances for said major diameter, said terminal portion of said thread being at least one full final thread pitch, and said terminal portion including a tail portion which falls below said major diameter but which is of insufficient length to allow said washer to slide over said at least one full final thread pitch.

2. The fastener assembly of claim 1, said thread having a pitch distance between adjacent thread pitch crests, and said washer being spaced from said terminal portion of said thread by a distance not more than said pitch distance.

3. The fastener assembly of claim 1, said elevations being peaks.

4. The fastener assembly of claim 1, said elevations being ridges across the thread width.

5. A fastener assembly comprising:
   a male threaded fastener having a head, a shank and a thread on said shank;
   a washer captured between said thread and said head;
   said thread having a last thread pitch adjacent said washer;
   said shank having a diameter adjacent said last thread pitch not less than a root diameter of thread pitches more distant from said washer; and
   said last thread pitch having a major diameter throughout a substantial length thereof not less than said washer opening diameter of said washer;
   said last thread pitch of said thread having crest depressions and elevations between adjacent said depressions, said last thread pitch including a tail portion which falls below said major diameter but which is of insufficient length to allow said washer to slide over said last thread pitch.

6. The fastener assembly of claim 5, said elevations being peaks.

7. The fastener assembly of claim 5, said elevations being elongated ridges across the width of the thread.

8. A threaded fastener comprising;
   a shank;
   a head at an end of said shank;
   a helical thread on said shank, said helical thread having a thread crest defining a major diameter of said fastener; and
   a terminal portion of said thread adjacent said head, said terminal portion being at least one full thread pitch, said terminal portion including a first portion having decreasing material volume while maintaining said major diameter, and a tail portion that is less than one full thread pitch and that falls below said major diameter.

9. The fastener of claim 8, said terminal portion of said thread having spaced depressions and elevations between said depressions, said elevations defining said major diameter.

10. The fastener of claim 9, said depressions being of progressively increasing size toward the end of the thread.

11. The fastener of claim 9, said elevations being spaced progressively more distant from adjacent said elevations toward the end of the thread.

12. The fastener of claim 9, said elevations being peaks.

13. The fastener of claim 9, said elevations being elongated ridges across the width of the thread.

14. The fastener of claim 9, including a washer captured on said shank between said head and said terminal portion of said thread.

15. The fastener of claim 14, said thread having a pitch distance as the axial distance between adjacent thread crests, and said washer being spaced from said terminal portion of said thread a distance not more than said pitch distance.

16. The fastener of claim 8, including a washer captured on said shank between said head and said terminal portion of said thread.

17. The fastener of claim 16, said thread having a pitch distance as the axial distance between adjacent thread crests, and said washer being spaced from said terminal portion of said thread a distance not more than said pitch distance.

* * * * *